United States Patent [19]

Munoz

[11] Patent Number: 4,757,751
[45] Date of Patent: Jul. 19, 1988

[54] RAM COULING AND CYLINDER END SEAL ASSEMBLY FOR HIGH PRESSURE CYLINDER

[75] Inventor: Jose P. Munoz, Joplin, Mo.

[73] Assignee: Ingersoll-Rand Company, Woodcliff Lake, N.J.

[21] Appl. No.: 53,773

[22] Filed: May 26, 1987

[51] Int. Cl.$^4$ .................. F16J 15/18; B65D 53/00; E21B 33/00; B25G 3/02

[52] U.S. Cl. .................. 92/165 R; 92/128; 277/44; 277/183; 277/192; 403/261; 403/326; 403/360

[58] Field of Search .............. 92/128, 165 R, 166, 92/168, 256; 417/225, 226, 568; 403/154, 261, 326, 360, 361; 277/44, 125, 183, 192, 199, DIG. 7

[56] References Cited

U.S. PATENT DOCUMENTS

| | | | |
|---|---|---|---|
| 2,690,939 | 10/1954 | Whaley | 92/165 R |
| 3,136,230 | 6/1964 | Buckley | 92/165 R X |
| 3,627,361 | 12/1971 | Bimba | 403/360 X |
| 3,631,767 | 1/1972 | Meier | 92/165 R |
| 3,722,374 | 3/1973 | Densmore | 92/165 R X |
| 3,916,771 | 11/1975 | Nendzig et al. | 92/165 R X |
| 3,940,151 | 2/1976 | Phillips | 92/165 R X |
| 3,951,048 | 4/1976 | Bloom et al. | 403/261 X |
| 4,182,578 | 1/1980 | Livesay et al. | 403/360 X |
| 4,324,171 | 4/1982 | Gaylord et al. | 92/165 R X |
| 4,476,772 | 10/1984 | Gorman et al. | 277/125 X |
| 4,531,452 | 7/1985 | Spielmann et al. | 92/168 |
| 4,627,332 | 12/1986 | Furuta et al. | 60/533 X |
| 4,630,958 | 12/1986 | McCallister | 403/326 X |

Primary Examiner—Robert E. Garrett
Assistant Examiner—George Kapsalas
Attorney, Agent, or Firm—B. J. Murphy

[57] ABSTRACT

The plunger of the high-pressure cylinder has a driving ram coupled at one end. The coupling includes an annular groove on the plunger end and a two-piece collar with inner ridge. A cup-shaped collar retainer and a snap ring retain the collar in the ram. The coupling eliminates bolting. The open cylinder end is shouldered and grooved to receive a sleeve, a multi-piece key, a seat, and a seal which assemble to receive, center, and seal the plunger in the high pressure cylinder. The seal assembly eliminates the need for a bolted cylinder end.

7 Claims, 2 Drawing Sheets

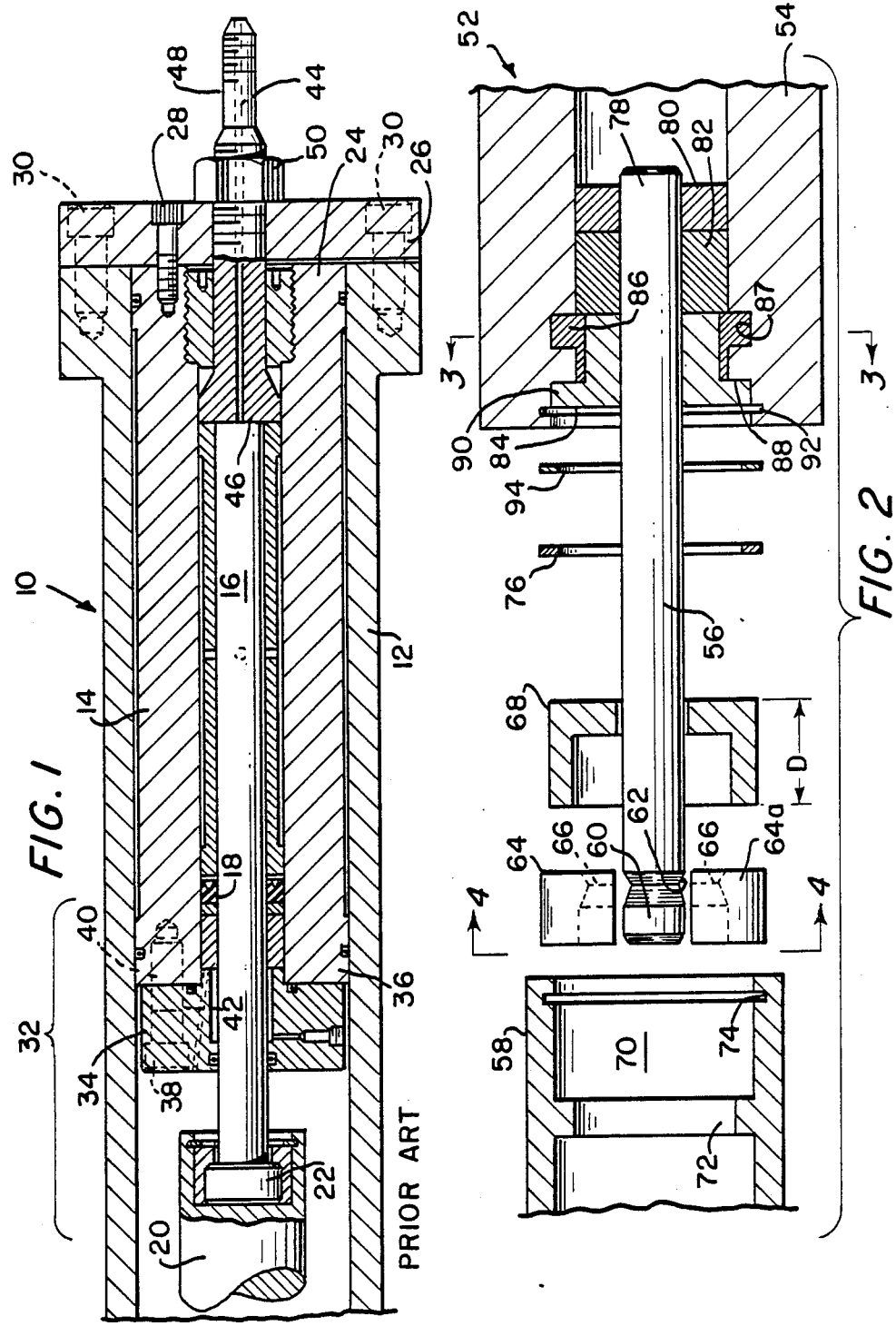

RAM COUPLING AND CYLINDER END SEAL ASSEMBLY FOR HIGH PRESSURE CYLINDER

BACKGROUND OF THE INVENTION

1. Field of the Prior Art

This invention pertains to coupling and seal assemblies, and in particular to a novel coupling and seal assembly having an especial utility in a high-pressure, liquid intensifier, or the like.

2. Description of the Prior Art

Known coupling and seal assemblies, such as are used in high-pressure, liquid intensifiers, for instance, present laborious assembly and disassembly procedures, and are expensive to manufacture. Commonly, such assemblies comprise bolting; the bolts are subject to fretting, damaging over-torquing, or dangerous under-torquing, and are exposed to the liquid and, consequently, accumulate chemical deposits and become quite difficult to remove. The practice of bolting these assemblies, requires tapped holes in receiving components, and this is unduly expensive, requires correct alignment of bolted elements on assembly (or reassembly), and diminishes the structural integrity of the tapped, receiving components.

What has been needed, and is the object of this invention, is a coupling and seal assembly which has little or none of the aforecited disadvantages.

SUMMARY OF THE INVENTION

Particularly, it is an object of this invention to set forth a coupling and seal assembly, for use in a high-pressure, liquid intensifier, or the like, comprising a cylinder; means at one end of said cylinder for admitting pressurized liquid into said cylinder; a plunger; a ram; means engaging both said ram and an end of said plunger, removably coupling said ram to said end of said plunger; and apertured means, in the other end of said cylinder, for (a) slidably receiving said plunger therewithin, and (b) centering said plunger in said cylinder; wherein said receiving and centering means includes means for sealing said cylinder against leakage of liquid therefrom via said other end thereof; and further including means securing said receiving and centering means in said cylinder against removal thereof via said other end; said securing means being but a single retaining ring.

Further objects of this invention, as well as the novel features thereof, will become more apparent by reference to the following description taken in conjunction with the accompanying figures, in which:

BRIEF DESCRIPTION OF THE DRAWINGS

FIG. 1 is a cross-sectional view of a high-pressure cylinder assembly, in a liquid intensifier, the same being taken along the longitudinal axis thereof;

FIG. 2 is a cross-sectioned, partly exploded, view of an embodiment of the instant invention;

DESCRIPTION OF THE PREFERRED EMBODIMENTS

Figure 4:
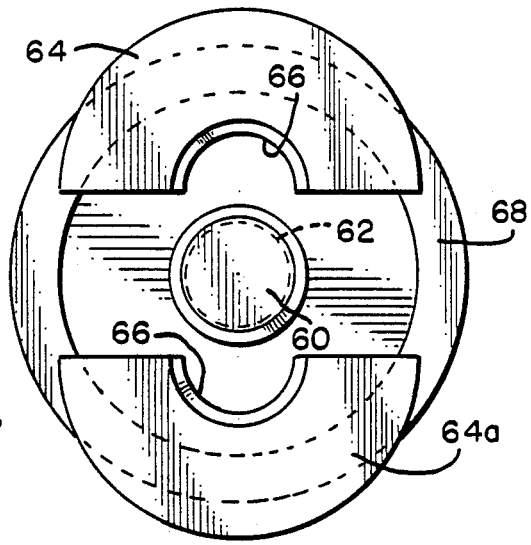
FIG. 4 is an end view of the ram, split collar, and collar retainer, taken along 4—4 of FIG. 2.

As shown in FIG. 1, a prior art high-pressure cylinder assembly 10 comprises a casing 12 in which is confined a high-pressure cylinder 14. The cylinder 14 confines a plunger 16 therewithin, and plunger/cylinder sealing elements 18. A ram 20 is removably coupled to the headed, extended end 22 of the plunger 16. The outermost end 24 of the cylinder 14 abuts an end plate 26 which is secured to the cylinder 14 by bolts 28 (only one is shown), and secured to the casing 12 by bolts 30.

The coupling and seal assembly 32 of this prior art arrangement is generally encompassed by the bracketed portion shown in FIG. 1. It can be noted that an end cap 34 is fastened to the inner end 36 of the cylinder 14 by bolts 38 (only one is shown). Consequently, the end 36 of the cylinder 14 has had to have a plurality of tapped holes 40 formed therein, and the end cap 34 has a corresponding number of bolt holes 42 formed therein.

A conduit 44 for high-pressure liquid has a head portion 46 which is captive in the cylinder 14 and extends beyond the cylinder 14 with a threaded, terminal end 48. A bolt 50 secures the end 48 fast in the plate 26. It needs to be understood that while not shown thus, for simplicity, the instant invention, the coupling and seal assembly 52 of FIG. 2 (and 3 and 4) is incorporated in a like high-pressure cylinder assembly—having a casing 12, plate 26, conduit 44, etc.—but is of greatly simplified construction, and omits the end cap 34, bolts 38, tapped holes 40 and bolt holes 42 (of FIG. 1).

Coupling and seal assembly 52 comprises a high-pressure cylinder 54, a plunger 56 and a ram 58. An end 60 of the plunger 56 has a cleft-shaped, annular groove 62 formed therein. A collar of two pieces 64 and 64a is fitted to plunger end 60; each piece 64 and 64a a has an inwardly-directed, arcuate ridge 66, and the latter engage the groove 62 to close the collar about the plunger end 60. A cup-shaped, centrally bored, collar retainer 68 slidably fits about the collared end of the plunger and, in turn, is snugly received, in the adjacent end of the ram 58.

The aforesaid end of the ram 58 has a cylindrical pocket 70 formed therein with an annular, inwardly-extending wall 72. Adjacnet an outer end thereof, the pocket 70 has an annular groove 74 formed in an inner surface thereof. The wall 72 and groove 74 are spaced apart a given dimension, and the collar retainer 68 has a depth, or axial length "D" which is substantailly the same given dimension. A retaining ring 76 is received in the groove 74, to secure the collar 64, 64a and collar retainer 68 in the pocket 70. The aforesaid substantially same dimensions, and wall 72 and ring 76, provide for a snug reception and fit of retainer 68 (and collar 64, 64a) in the pocket 70.

Within the high-pressure cylinder 54 are a series of components which serve to receive and center the working end 78 of the plunger 56, and to seal the cylinder against leakage of fluid therefrom. The innermost component is a seal 80 which sealingly engages the wall of the cylinder 54 and the outside-diameter surface of the plunger 56. Seal 80 is set against a seal seat 82. In turn, the seat 82 abuts a key-positioning sleeve 84, and a three-piece key 86 which nests in an annular keyway 87 formed in the cylinder 54.

The cylinder 54 has an annular shoulder 88 formed therein adjacent to the end thereof, and the sleeve 84 has an outwardly-extending flange 90 which sets into the shoulder 88. Finally, the cylinder 54 also has an inner, circumferential groove 92 in which is received a resilient retaining ring 94. The latter secures the sleeve 84 in place, and the outer surface of the sleeve 84 comprises a land which slidably receives and radially positions the three piece key 86.

Figure 3:
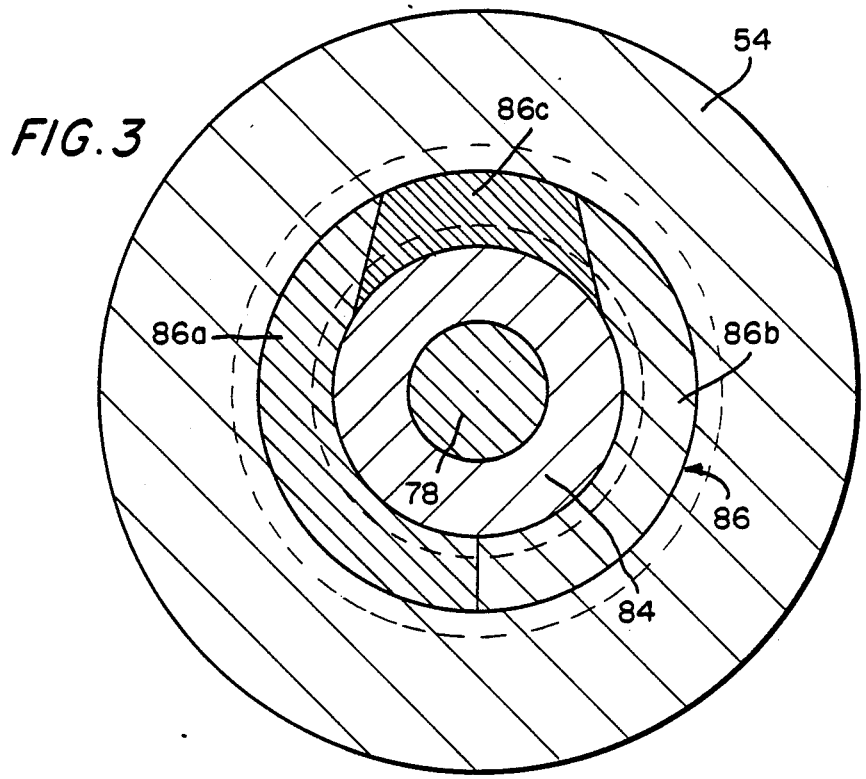
FIG. 3 is a cross-sectional view taken along section 3—3 of FIG. 2.

As shown in FIG. 3, the key 86 has two, mirror-imaged pieces 86a and 86b; the third piece 86c is the smaller, and is of outwardly-diverging configuration.

On disassembly, ring 94 is removed from groove 92 to permit removal of the sleeve 84 and the key pieces 86a, 86b and 86c. To extract the seat 82 and seal 80, liquid is admitted into the cylinder 54 to fill it, and the plunger 56 is thrust thereinto. Displacement of the liquid by the plunger 56 forces the seal 80 and seat 82 to remove from the cylinder.

While I have described my invention in connection with a specific embodiment thereof, it is to be clearly understood that this is done only by way of example, and not as a limitation to the scope of my invention as set forth in the objects thereof and in the appended claims.

I claim:

1. A coupling and seal assembly, for use in a high-pressure, liquid intensifier, or the like, comprising: a cylinder;
   means at one end of said cylinder for admitting pressurized liquid into said cylinder;
   a plunger;
   a ram;
   means, engaging both said ram and a first end of said plunger, removably coupling said ram to said first end of said plunger; and
   apertured means, in the other end of said cylinder, (a) slidably receiving said plunger therewithin, and (b) centering said plunger in said cylinder; wherein
   said receiving and centering means includes means for sealing said cylinder against leakage of liquid therefrom via said other end thereof; and further including
   means securing said receiving and centering means in said cylinder against removal thereof via said other end;
   said securing means being but a singal retaining ring; wherein
   said sealing means comprises an annular seal sealingly engaged with a second end of said plunger and with said cylinder;
   said receiving and centering means further includes an annular seal seat (a) receiving said seal thereagainst, and (b) set about said second end of said plunger;
   said receiving and centering means also includes keying means set in said cylinder, receiving said seal seat thereagainst, and obstructing removal of said seal seat and seal via said other end of said cylinder;
   said receiving and centering means further includes annular means, for positioning said keying means, set about said second end of said plunger;
   said annular, positioning means has a circumferential land;
   said keying means is slidably engaged with said land and is concentric with said annular, positioning means;
   said annular, positioning means comprises a sleeve having an outwardly-extending flange;
   said cylinder has an annular, recessed shoulder formed in said other end thereof; and
   said flange of said positioning means is set against said shoulder.

2. A coupling and seal assembly, according to claim 1, wherein:
   said keying means comprises at least three segments;
   each of said segments has a peripheral, arcuate key formed thereon;
   said cylinder has an annular groove or keyway formed therein; and
   said keys of said segments nest in said keyway.

3. A coupling and seal assembly, according to claim 1, wherein:
   said other end of said cylinder has an annualr channel formed therein, in immediate adjacency to, and concentric with, said shoulder, in which, removably, to receive said retaining ring;
   said channel being outboard of said shoulder, relative to said other end of said cylinder.

4. A coupling and seal assembly, according to claim 1, wherein:
   said first end of said plunger has a cleft formed in a portion thereof;
   a collar is set about said portion and has a ridge, extending inwardly thereof, which latchingly engages said cleft to retain said collar in said set position.

5. A coupling and seal assembly, according to claim 4, wherein:
   said ram-to-plunger coupling means comprises a generally cup-shaped, centrally bored, collar retainer; and
   said retainer is slidably engaged with said first end of said plunger, via the central bore therein, and confines said collar therewithin.

6. A coupling and seal assembly, according to claim 4, wherein:
   said collar comprises a plurality of parts.

7. A coupling and seal assembly, according to claim 5, wherein:
   said ram has a cylindrical pocket formed in an end thereof, an annular groove for a retaining ring, and an annular wall extending inwardly thereof and spaced apart from said groove a given dimension; and
   said retainer has an axial length of substantially said same given dimension; whereby
   said retainer is snugly received in said pocket.

* * * * *